United States Patent
Weng

(10) Patent No.: US 12,107,469 B2
(45) Date of Patent: Oct. 1, 2024

(54) MULTI-AXIAL WAVE ENERGY CONVERSION DEVICE

(71) Applicant: FLH Energy Technology Ltd., New Taipei (TW)

(72) Inventor: Ching-Liang Weng, New Taipei (TW)

(73) Assignee: FLH Energy Technology Ltd., New Taipei (TW)

( * ) Notice: Subject to any disclaimer, the term of this patent is extended or adjusted under 35 U.S.C. 154(b) by 0 days.

(21) Appl. No.: 17/496,775

(22) Filed: Oct. 8, 2021

(65) Prior Publication Data
US 2022/0224211 A1 Jul. 14, 2022

(30) Foreign Application Priority Data
Jan. 13, 2021 (TW) ................ 110101243

(51) Int. Cl.
*F03B 13/16* (2006.01)
*H02K 7/18* (2006.01)
*H02K 21/14* (2006.01)

(52) U.S. Cl.
CPC ............. *H02K 21/14* (2013.01); *F03B 13/16* (2013.01); *H02K 7/1853* (2013.01); *H02K 2201/18* (2013.01)

(58) Field of Classification Search
CPC .... F03B 13/16; H02K 7/1853; H02K 2201/18
USPC .................................................. 290/42, 53
See application file for complete search history.

(56) References Cited

U.S. PATENT DOCUMENTS

| | | | |
|---|---|---|---|
| 4,092,828 A * | 6/1978 | Garza | F03B 13/1815 60/505 |
| 4,260,901 A | 4/1981 | Woodbridge | |
| 5,789,826 A * | 8/1998 | Kumbatovic | F03B 13/1835 290/43 |

(Continued)

FOREIGN PATENT DOCUMENTS

| | | |
|---|---|---|
| BR | 9204741 A | 7/1994 |
| CN | 101000031 A | 7/2007 |

(Continued)

OTHER PUBLICATIONS

Han, the specification, including the claims, and drawings in the U.S. Appl. No. 17/369,981, filed Jul. 8, 2021.
(Continued)

*Primary Examiner* — Tulsidas C Patel
*Assistant Examiner* — S. Mikailoff
(74) *Attorney, Agent, or Firm* — Winston Hsu

(57) ABSTRACT

A multi-axial wave energy conversion device includes a main body and a plurality of permanent magnet generating assemblies. Each permanent magnet generating assembly includes at least one permanent magnet generator, an arm and a driving component. The at least one permanent magnet generator includes a stator structure and a rotor structure capable of rotating or swinging relative to the stator structure. The at least one permanent magnet generator is disposed or coupled between the main body and the arm or disposed or coupled between the arm and the driving component, so that the rotor structure is driven to rotate or swing relative to the stator structure when the arm moves relative to the main body or the driving component moves relative to the arm.

2 Claims, 9 Drawing Sheets

(56) References Cited

U.S. PATENT DOCUMENTS

| | | | | |
|---|---|---|---|---|
| 7,443,047 | B2* | 10/2008 | Ottersen | F03B 13/20 290/53 |
| 8,358,025 | B2* | 1/2013 | Hogmoe | F03B 13/20 290/53 |
| 11,719,217 | B2* | 8/2023 | Weng | F03B 13/1805 416/6 |
| 11,870,306 | B2* | 1/2024 | Weng | H02K 7/1892 |
| 2004/0155537 | A1 | 8/2004 | Nakano | |
| 2008/0036215 | A1 | 2/2008 | Gizaw | |
| 2008/0211338 | A1 | 9/2008 | Koka | |
| 2010/0127500 | A1 | 5/2010 | Yang | |
| 2011/0042954 | A1* | 2/2011 | Werjefelt | F03B 13/20 290/53 |
| 2012/0093644 | A1 | 4/2012 | Croughs | |
| 2012/0187696 | A1 | 7/2012 | Miyamoto | |
| 2013/0008158 | A1* | 1/2013 | Hon | F03B 13/24 60/506 |
| 2014/0248151 | A1 | 9/2014 | Dong | |
| 2018/0010571 | A1* | 1/2018 | Werjefelt | F03B 13/20 |
| 2019/0006900 | A1 | 1/2019 | Nakayama | |
| 2019/0252933 | A1 | 8/2019 | Yatsurugi | |
| 2022/0220931 | A1* | 7/2022 | Weng | H02K 7/1876 |
| 2022/0224211 | A1* | 7/2022 | Weng | F03B 13/16 |
| 2022/0224212 | A1* | 7/2022 | Han | H02K 21/145 |
| 2023/0175470 | A1* | 6/2023 | Weng | F03B 13/182 416/6 |

FOREIGN PATENT DOCUMENTS

| | | |
|---|---|---|
| CN | 103147903 A | 6/2013 |
| CN | 104564499 A | 4/2015 |
| CN | 104564500 A | 4/2015 |
| CN | 204669112 U | 9/2015 |
| CN | 205070625 U | 3/2016 |
| CN | 103994015 B | 8/2016 |
| CN | 103821662 B | 11/2017 |
| CN | 108105019 A | 6/2018 |
| CN | 108286489 A | 7/2018 |
| CN | 108518300 A | 9/2018 |
| CN | 107370335 B | 3/2019 |
| CN | 106655622 B | 4/2019 |
| CN | 109653939 A | 4/2019 |
| CN | 208884467 U | 5/2019 |
| CN | 210033739 U | 2/2020 |
| CN | 109185024 B | 5/2020 |
| CN | 111472920 A | 7/2020 |
| CN | 111963363 A | 11/2020 |
| DE | 196 12 124 A1 | 10/1997 |
| DE | 102017105914 A1 * | 9/2018 |
| EP | 1 458 080 A1 | 9/2004 |
| GB | 2551563 A | 12/2017 |
| KR | 10-1704521 B1 | 2/2017 |
| TW | M408189 U1 | 7/2011 |
| TW | M431224 U1 | 6/2012 |
| TW | 201230617 A1 | 7/2012 |
| TW | 201636503 A | 10/2016 |
| TW | 201902345 A | 1/2019 |
| WO | 2008/004893 A1 | 1/2008 |

OTHER PUBLICATIONS

Weng, the specification, including the claims, and drawings in the U.S. Appl. No. 17/372,556, filed Jul. 12, 2021.

* cited by examiner

MULTI-AXIAL WAVE ENERGY CONVERSION DEVICE

BACKGROUND OF THE INVENTION

1. Field of the Invention

The present invention relates to an energy conversion device, and more specifically, to a multi-axial wave energy conversion device.

2. Description of the Prior Art

Wave energy conversion technology is used for converting wave energy into electricity. The wave energy is unstable and irregular but is inexhaustible in supply and always available for use. Therefore, wave energy conversion has a greater potential than any other ocean energy conversion, and it becomes an important topic in the field to reduce maintenance cost, improve reliability, and stabilize an amount of electricity generation of the wave energy conversion.

SUMMARY OF THE INVENTION

Therefore, it is an objective of the present invention to provide a multi-axial wave energy conversion device for solving the aforementioned problem.

In order to achieve the aforementioned objective, the present invention discloses a multi-axial wave energy conversion device including a main body and at least one permanent magnet generating assembly. The at least one permanent magnet generating assembly disposed on the main body. The at least one permanent magnet generating assembly includes at least one permanent magnet generator, an arm and a driving component. The at least one permanent magnet generator includes a stator structure and a rotor structure capable of rotating or swinging relative to the stator structure. The at least one permanent magnet generator is disposed or coupled between the main body and the arm or between the arm and the driving component, and the rotor structure is driven to rotate or swing relative to the stator structure when the arm moves relative to the main body or the driving component moves relative to the arm. The at least one permanent magnet generator includes a third permanent magnet generator. A first end of the arm is coupled to the main body. A second end of the arm is coupled to the third permanent magnet generator. The third permanent magnet generator includes a third stator structure and a third rotor structure. The driving component is directly connected to the third rotor structure. The first end of the arm is capable of rotating or swinging relative to the main body around a first axis. The second end of the arm is capable of rotating or swinging relative to the driving component around a second axis parallel to the first axis and a third axis different from the first axis and the second axis According to an embodiment of the present invention, the third stator structure includes a third stator body. The third rotor structure includes a third rotor body. The third rotor body is disposed inside the third stator body in a swinging manner or a rotating manner. The at least one permanent magnet generator further includes a first permanent magnet generator and a second permanent magnet generator. The first permanent magnet generator is coupled to or disposed on the main body. The first permanent magnet generator is coupled to the first end of the arm. The first permanent magnet generator includes a first stator structure and a first rotor structure. The first stator structure includes a first stator body. The first rotor structure includes a first rotor body, and the first rotor body is disposed inside the first stator body in a swinging manner or a rotating manner. The second permanent magnet generator is coupled to the third permanent magnet generator and the second end of the arm. The second permanent magnet generator includes a second stator structure and a second rotor structure. The second stator structure includes a second stator body. The second rotor structure includes a second rotor body, and the second rotor body is disposed inside the second stator body in a swinging manner or a rotating manner.

According to an embodiment of the present invention, a plurality of first stator slots are formed on the first stator body. A central axis of the first stator body is coincided with a central axis of the first rotor body. The plurality of first stator slots are arranged along a circumferential direction of the first stator body. A plurality of first rotor slots are formed on the first rotor body. The plurality of first rotor slots are arranged along a circumferential direction of the first rotor body. A plurality of second stator slots are formed on the second stator body. A central axis of the second stator body is coincided with a central axis of the second rotor body. The plurality of second stator slots are arranged along a circumferential direction of the second stator body. A plurality of second rotor slots are formed on the second rotor body. The plurality of second rotor slots are arranged along a circumferential direction of the second rotor body. A plurality of third stator slots are formed on the third stator body. A central axis of the third stator body is coincided with a central axis of the third rotor body. The plurality of third stator slots are arranged along a circumferential direction of the third stator body. A plurality of third rotor slots are formed on the third rotor body, and the plurality of third rotor slots are arranged along a circumferential direction of the third rotor body.

According to an embodiment of the present invention, each of the first stator body, the first rotor body, the second stator body, the second rotor body, the third stator body and the third rotor body is a circular column.

According to an embodiment of the present invention, the first rotor structure further includes a plurality of first permanent magnets respectively disposed inside the plurality of first rotor slots. A number of the plurality of first permanent magnets is identical to a number of the plurality of first rotor slots. The first stator structure further includes a plurality of first stator coils wrapped around the plurality of first stator slots. The second rotor structure further includes a plurality of second permanent magnets respectively disposed inside the plurality of second rotor slots. A number of the plurality of second permanent magnets is identical to a number of the plurality of second rotor slots. The second stator structure further includes a plurality of second stator coils wrapped around the plurality of second stator slots. The third rotor structure further includes a plurality of third permanent magnets respectively disposed inside the plurality of third rotor slots. A number of the plurality of third permanent magnets is identical to a number of the plurality of third rotor slots, and the third stator structure further includes a plurality of third stator coils wrapped around the plurality of third stator slots.

According to an embodiment of the present invention, the first stator structure further includes a first shell. The first stator body is fixedly disposed inside the first shell. The second stator structure further includes a second shell. The second stator body is fixedly disposed inside the second shell. The third stator structure further includes a third shell, and the third stator body is fixedly disposed inside the third shell.

According to an embodiment of the present invention, the first rotor structure further includes a first connecting shaft coupled to the first rotor body. The first connecting shaft passes through the first shell. The second rotor structure further includes a second connecting shaft coupled to the second rotor body. The second connecting shaft passes through the second shell. The third rotor structure further includes a third connecting shaft coupled to the third rotor body, and the third connecting shaft passes through the third shell.

According to an embodiment of the present invention, each of the first stator body, the first rotor body, the second stator body, the second rotor body, the third stator body and the third rotor body is formed by a plurality of silicon steel sheets.

According to an embodiment of the present invention, the driving component includes a floating component.

According to an embodiment of the present invention, the stator structure of the at least one permanent magnet generator includes a stator body, a plurality of stator coils and a shell. The stator body is fixedly disposed inside the shell. A plurality of stator slots are formed on the stator body. The plurality of stator coils are wrapped around the plurality of stator slots. The rotor structure of the at least one permanent magnet generator includes a rotor body and a plurality of permanent magnets. The rotor body is disposed inside the stator body in a swinging manner or a rotating manner. A plurality of rotor slots are formed on the rotor body. The plurality of permanent magnets are respectively disposed inside the plurality of rotor slots. Each of the stator body and the rotor body is a circular column and formed by a plurality of silicon steel sheets. The plurality of stator slots are arranged along a circumferential direction of the stator body, and the plurality of rotor slots are arranged along a circumferential direction of the rotor body.

According to an embodiment of the present invention, the first end of the arm is connected to the main body in a rotating or swinging manner around the first axis. The second end of the arm is connected to a third shell of the third stator structure of the third permanent magnet generator in a rotating or swinging manner around the third axis. A third rotor body of the third rotor structure is disposed inside a third stator body of the third stator structure in a rotating or swinging manner around the second axis. The at least one permanent magnet generating assembly further includes at least one hydraulic power generation device disposed between the arm and the main body and/or between the arm and the third permanent magnet generator.

According to an embodiment of the present invention, the at least one hydraulic power generation device includes a first hydraulic power generation device disposed between the arm and the main body and a second hydraulic power generation device disposed between the arm and the third permanent magnet generator.

In summary, in the present invention, the multi-axial wave energy conversion device can convert wave movements along different directions into a rotating movement or a swinging movement of the first rotor body relative to the first stator body, a rotating movement or a swinging movement of the second rotor body relative to the second stator body, and a rotating movement or a swinging movement of the third rotor body relative to the third stator body. Furthermore, a ratio of the number of the plurality of first rotor slots to a number of the plurality of first stator slots, a ratio of the number of the plurality of second rotor slots to a number of the plurality of second stator slots, and a ratio of the number of the plurality of third rotor slots to a number of the plurality of third stator slots are 8:9. The number of the plurality of first rotor slots, the number of the plurality of second rotor slots, and the number of the plurality of third rotor slots are at least equal to 64. The number of the plurality of first stator slots, the number of the plurality of second stator slots, and the number of the plurality of third stator slots are at least equal to 72. Due to the aforementioned configuration, the multi-axial wave energy conversion device only requires a low speed and a small angle of the rotating movement or the swinging movement of the first rotor body relative to the first stator body, a low speed and a small angle of the rotating movement or the swinging movement of the second rotor body relative to the second stator body, and a low speed and a small angle of the rotating movement or the swinging movement of the third rotor body relative to the third stator body, so as to generate electricity, but does not require a fixed wave direction. Therefore, even if amplitude of the wave movement is small and the wave direction is changed by wind, the multi-axial wave energy conversion device still can generate electricity stably, which improves reliability and stability of electricity generation. Besides, the multi-axial wave energy conversion device has simple structure, which reduces maintenance cost.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" or "couple" is intended to mean either an indirect or direct electrical/mechanical connection. Thus, if a first device is connected to or coupled to a second device, that connection may be through a direct electrical/mechanical connection, or through an indirect electrical/mechanical connection via other devices and connections.

Figure 1:
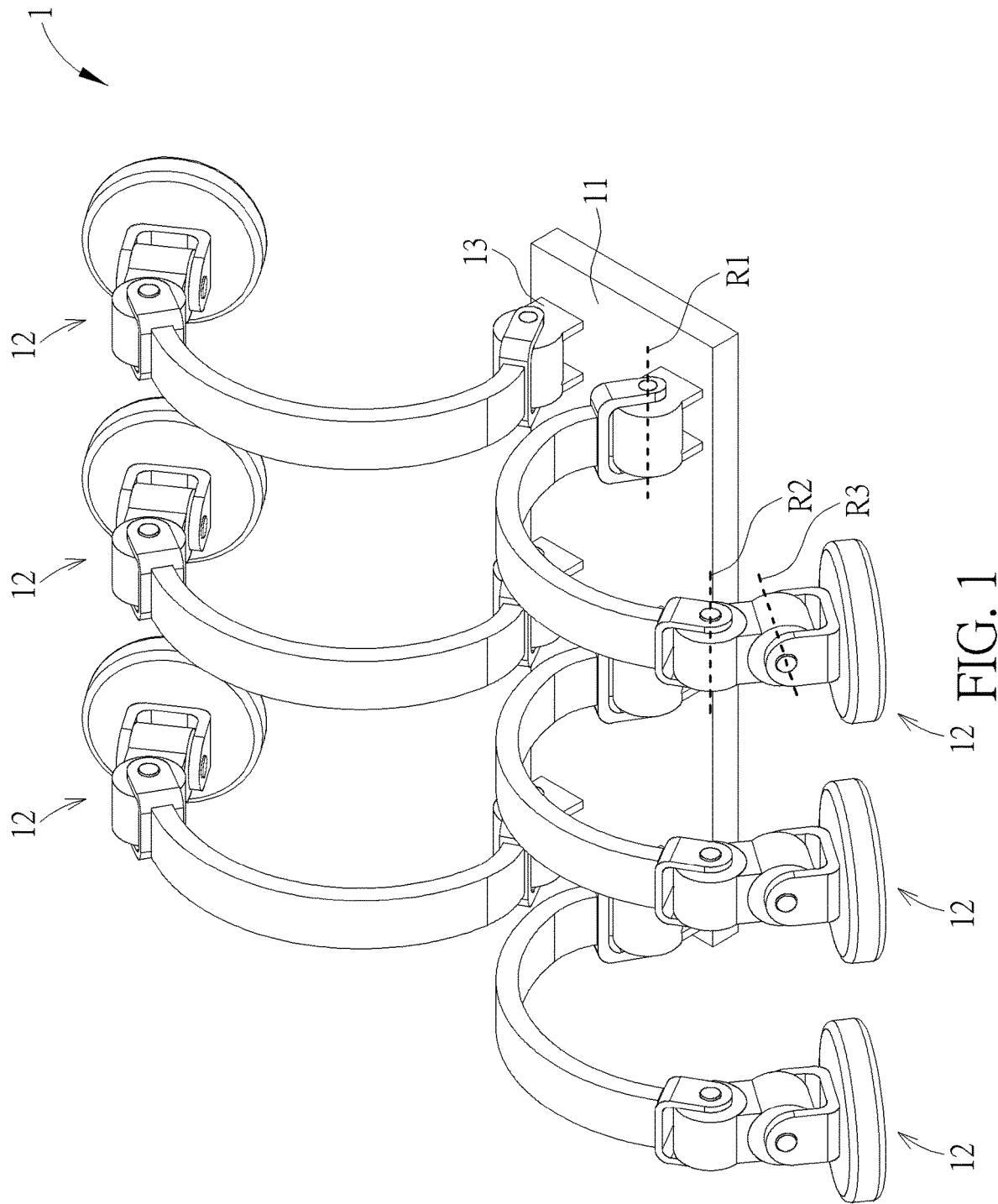
FIG. 1 is a schematic diagram of a multi-axial wave energy conversion device according to a first embodiment of the present invention.
Figure 2:
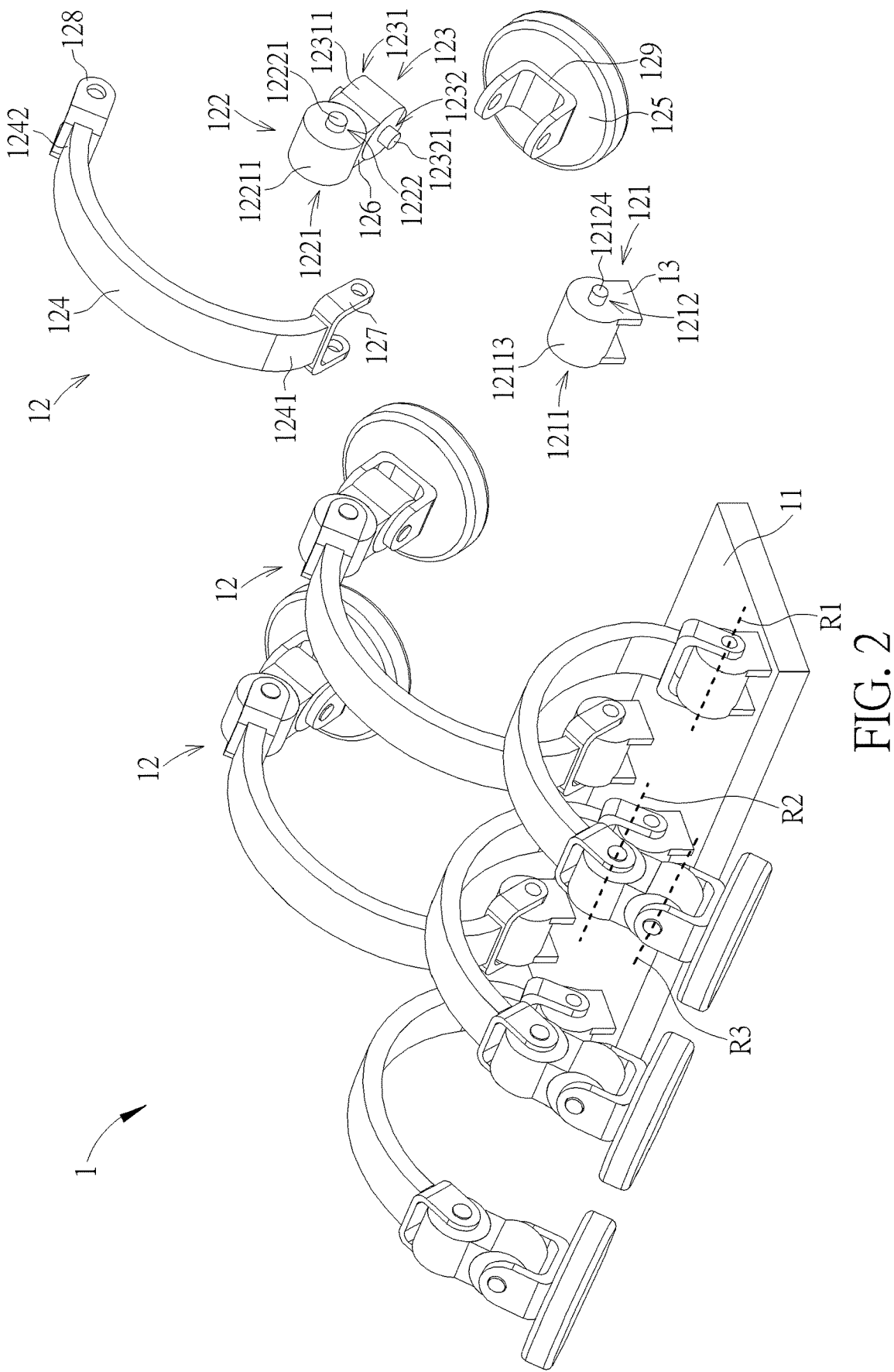
FIG. 2 and FIG. 3 are exploded diagrams of the multi-axial wave energy conversion device at different views according to the first embodiment of the present invention.
Figure 3:
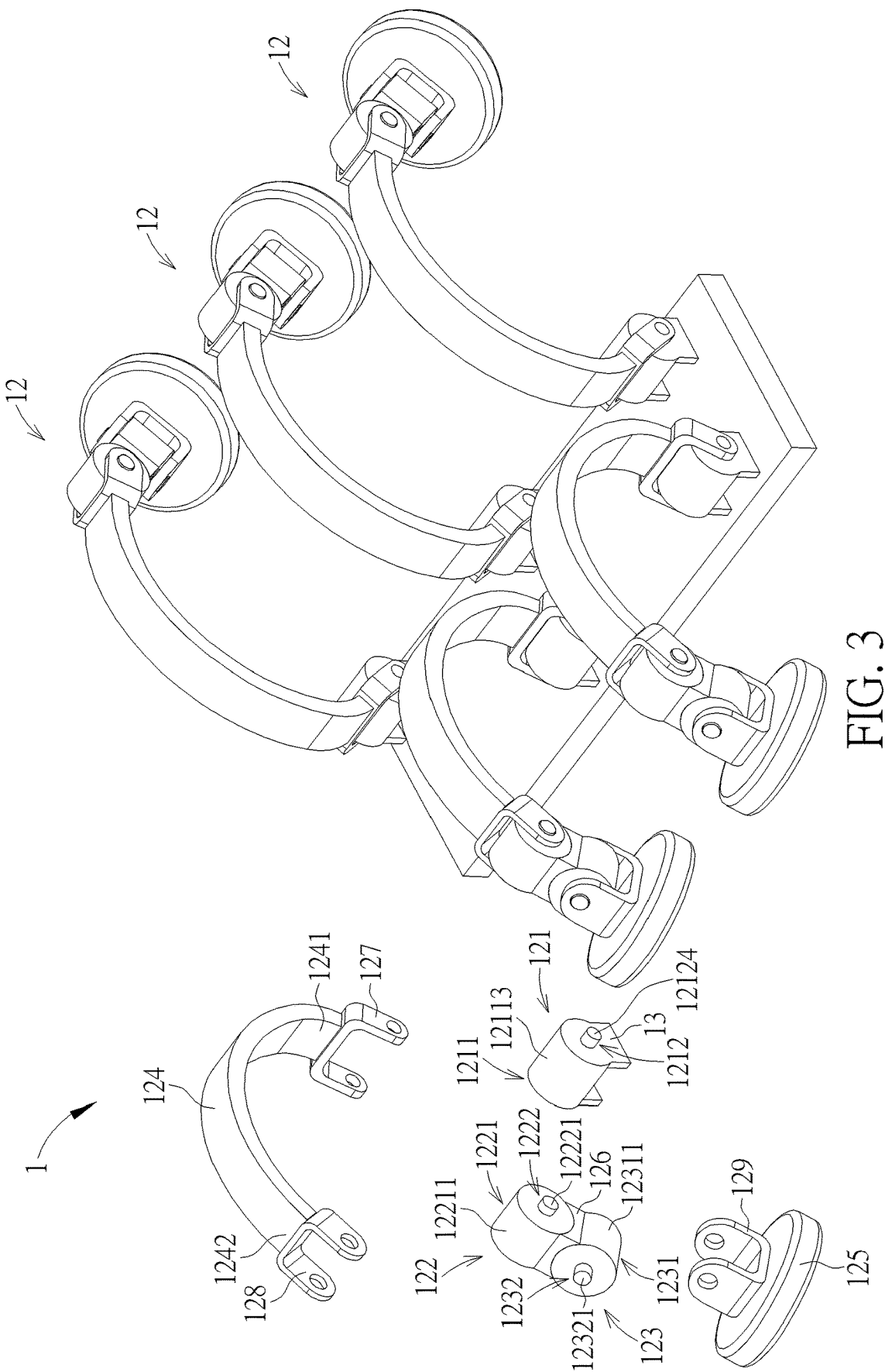
Figure 4:
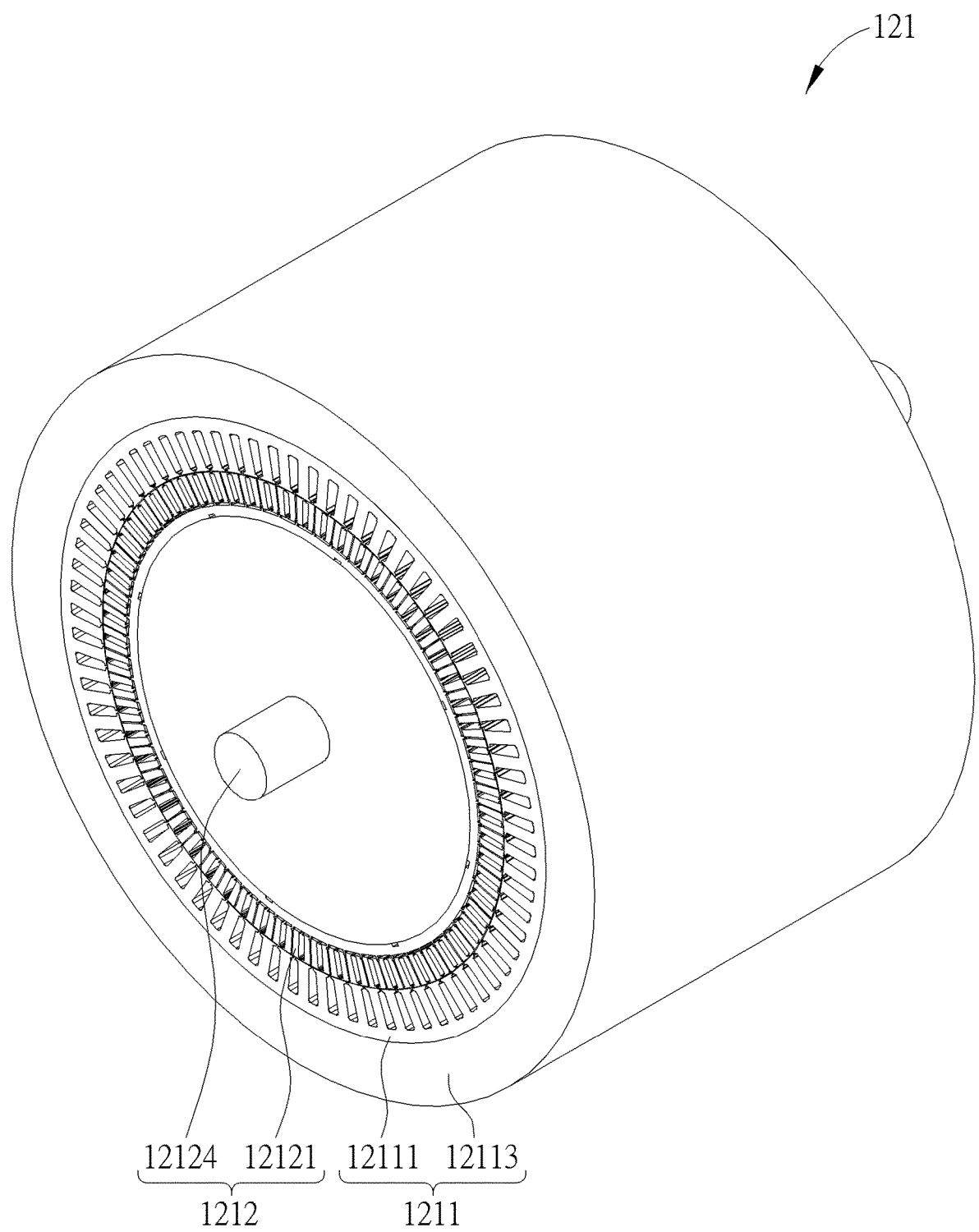
FIG. 4 is a partial diagram of a first permanent magnet generator according to the first embodiment of the present invention.
Figure 5:
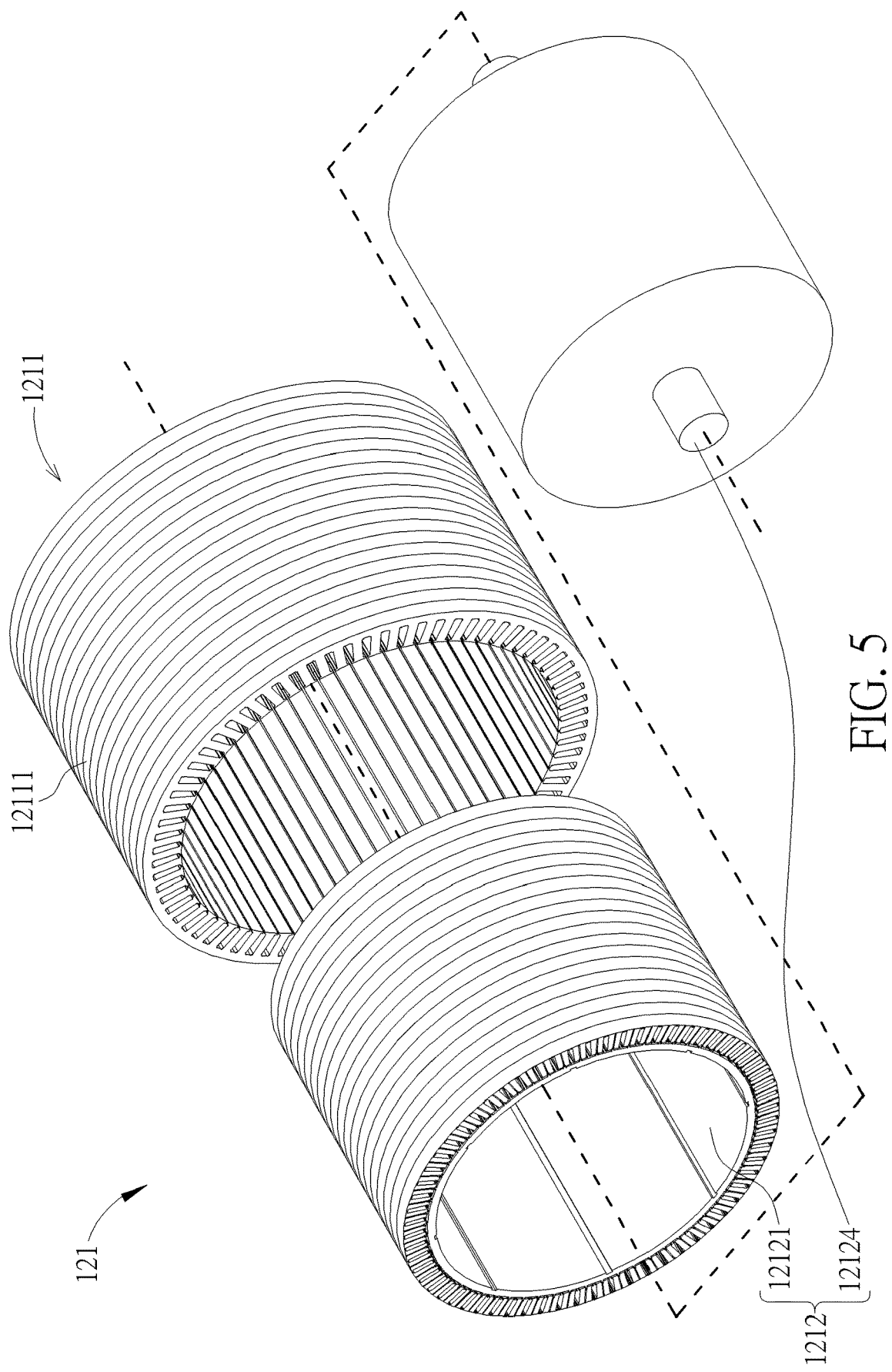
FIG. 5 is a partial exploded diagram of the first permanent magnet generator according to the first embodiment of the present invention.
Figure 6:
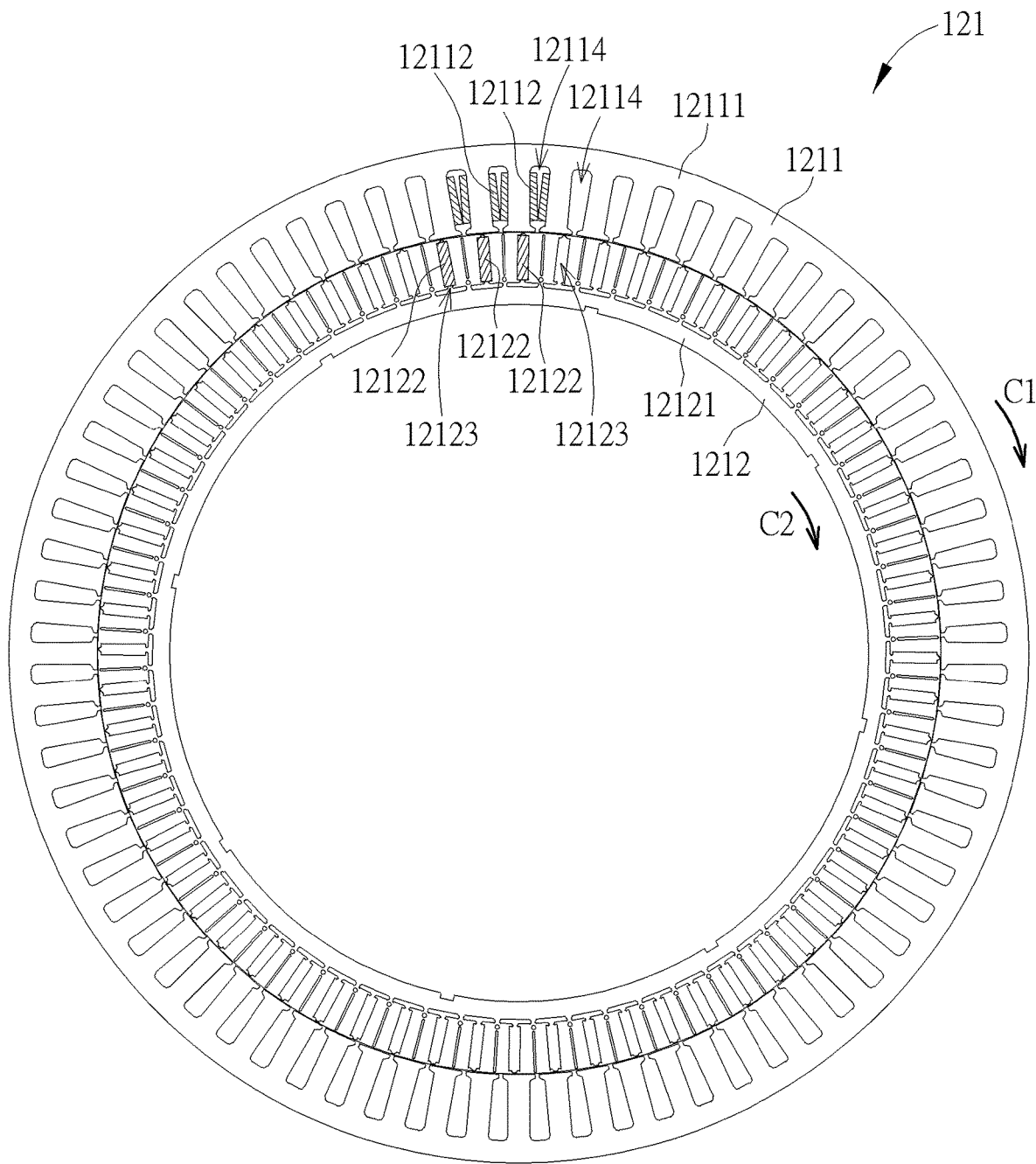
FIG. 6 is a partial sectional diagram of the first permanent magnet generator according to the first embodiment of the present invention.

Please refer to FIG. 1 to FIG. 6. FIG. 1 is a schematic diagram of a multi-axial wave energy conversion device 1 according to an embodiment of the present invention. FIG. 2 and FIG. 3 are exploded diagrams of the multi-axial wave energy conversion device 1 at different views according to the embodiment of the present invention. FIG. 4 is a partial diagram of a first permanent magnet generator 121 according to the embodiment of the present invention. FIG. 5 is a partial exploded diagram of the first permanent magnet generator 121 according to the embodiment of the present invention. FIG. 6 is a partial sectional diagram of the first permanent magnet generator 121 according to the embodiment of the present invention. As shown in FIG. 1 to FIG. 6, the multi-axial wave energy conversion device includes a main body 11 and six permanent magnet generating assemblies 12. The six permanent magnet generating assemblies 12 are disposed on the main body 11 and arranged in two rows of three. However, the number of the permanent magnet generating assembly is not limited to this embodiment. For example, in another embodiment, the multi-axial wave conversion energy device can include two permanent magnet generating assemblies which are arranged oppositely and symmetrically, or the multi-axial wave conversion energy device even can include only one permanent magnet generating assembly.

Furthermore, preferably, the main body 11 can be a floating plate placed above a surface of water. However, the present invention is not limited thereto. In another embodiment, the main body can be a berm, a vessel or a vehicle.

Each of the permanent magnet generating assembly 12 includes the first permanent magnet generator 121, a second permanent magnet generator 122, a third permanent magnet generator 123, an arm 124 and a driving component 125. The first permanent magnet generator 121 includes a first stator structure 1211 and a first rotor structure 1212 capable of swinging or rotating relative to the first stator structure 1211. The second permanent magnet generator 122 includes a second stator structure 1221 and a second rotor structure 1222 capable of swinging or rotating relative to the second stator structure 1221. The third permanent magnet generator 123 includes a third stator structure 1231 and a third rotor structure 1232 capable of swinging or rotating relative to the third stator structure 1231. The first stator structure 1211 of the first permanent magnet generator 121 is disposed on the main body 11. A first end 1241 of the arm 124 is coupled to the first rotor structure 1212 of the first permanent magnet generator 121. A second end 1242 of the arm 124 is coupled to the second rotor structure 1222 of the second permanent magnet generator 122. The third stator structure 1231 of the third permanent magnet generator 123 is coupled to the second stator structure 1221 of the second permanent magnet generator 122. The driving component 125 is coupled to, more specifically, directly connected to, the third rotor structure 1232 of the third permanent magnet generator 123.

Wave movements can drive the main body 11, the driving component 125 and the arm 124 to drive the first rotor structure 1212, the second rotor structure 1222, and the third rotor structure 1232 to rotate or swing relative to the first stator structure 1211, the second stator structure 1221, and the third stator structure 1231, respectively, for generating electrical currents by a magnetic field variation during a rotating movement or a swinging movement of the first rotor structure 1212 relative to the first stator structure 1211, a magnetic field variation during a rotating movement or a swinging movement of the second rotor structure 1222 relative to the second stator structure 1221, and a magnetic field variation during a rotating movement or a swinging movement of the third rotor structure 1232 relative to the third stator structure 1231, so as to achieve a purpose of electricity generation. Preferably, the driving component 125 can include a floating plate placed on the surface of the water. However, the present invention is not limited thereto.

As shown in FIG. 4 to FIG. 6, the first stator structure 1211 includes a first stator body 12111, a plurality of first stator coils 12112 and a first shell 12113. The first stator body 12111 is fixedly disposed inside the first shell 12113. A plurality of first stator slots 12114 are formed on the first stator body 12111. The plurality of first stator coils 12112 are wrapped around the plurality of first stator slots 12114 and for generating the electrical current. Preferably, the first stator body 12111 can be a circular column and made of magnetically conductive material, such as silicon steel. Specifically, the first stator body 12111 can be formed by a plurality of stacked ring-shaped silicon steel sheets.

The first rotor structure 1212 includes a first rotor body 12121 and a plurality of first permanent magnets 12122. The first rotor body 12121 is disposed inside the first stator body 12111 in a rotating manner or a swinging manner. A plurality of first rotor slots 12123 are formed on the first rotor body 12121. The plurality of first permanent magnets 12122 are disposed inside the plurality of first rotor slots 12123 respectively and configured to cause a magnetic flux variation when the first rotor body 12121 rotates or swings. Preferably, a number of the plurality of first permanent magnets 12122 can be identical to a number of the plurality of first rotor slots 12123, that is, each of the plurality of first permanent magnets 12122 is installed inside the corresponding first rotor slot 12123. However, in another embodiment, the number of the plurality of first permanent magnets can be less than the number of the plurality of first rotor slots. Preferably, the first rotor body 12121 can be a circular column and made of magnetically conductive material, such as silicon steel. Specifically, the first rotor body 12121 can be formed by a plurality of stacked ring-shaped silicon steel sheets.

A central axis of the first stator body 12111 is coincided with a central axis of the first rotor body 12121. The plurality of first stator slots 12114 are arranged along a circumferential direction C1 of the first stator body 12111, and the plurality of first rotor slots 12123 are arranged along a circumferential direction C2 of the first rotor body 12121. Preferably, the plurality of first stator slots 12114 can be arranged along the circumferential direction C1 of the first stator body 12111 at equal intervals, and the plurality of first rotor slots 12123 can be arranged along the circumferential direction C2 of the first rotor body 12121 at equal intervals.

It should be noticed that, in the present invention, as shown in FIG. 6, a ratio of the number of the plurality of first rotor slots 12123 to a number of the plurality of first stator slots 12114 is 8:9. Preferably, the number of the plurality of first rotor slots 12123 is at least equal to 64, and the number of the plurality of first stator slots 12114 is at least equal to 72. Due to the aforementioned configuration, the first permanent magnet generator 121 not only can generate electricity stably even in a condition of a low speed and a small angle of the rotating movement or the swinging movement of the first rotor body 12121 relative to the first stator body 12111 but also has better efficiency of electricity generation, which facilitates wave energy conversion. Specifically, for example, when the number of the plurality of the first rotor slots 12123 and the number of the plurality of the first stator slots 12114 are equal to 64 and 72, respectively, the first stator coils 12112 can generate the electrical current as long as the angle of the rotating movement or the swinging movement of the first rotor body 12121 relative to the first stator body 12111 reaches 22.5 degrees. Therefore, even if the first rotor body 12121 is driven by the waves to swing relative to the first stator body 12111 at a small angle back and forth instead of rotating relative to the first stator body 12111 along a fixed direction, the first permanent magnet generator 121 still can generate electricity. Furthermore, understandably, when the number of the plurality of the first rotor slots 12123 and the number of the plurality of the first stator slots 12114 are greater than 64 and 72, respectively, the angle of the rotating movement or the swinging movement of the first rotor body 12121 relative to the first stator body 12111 which is required for the first stator coils 12112 to generate the electrical current is less than 22.5 degrees, which allows the first permanent magnet generator 121 to generate electricity when the first rotor body 12121 is driven by the waves to swing relative to the first stator body 12111 at a smaller angle back and forth.

However, the structure of the first permanent magnet generator is not limited to the aforementioned embodiment. It depends on practical demands. For example, in another embodiment, each of the first rotor body and the first stator body can be formed by a plurality of stacked sector-shaped silicon steel sheets.

Besides, the internal structures of the second permanent magnet generator 122 and the third permanent magnet generator 123 can be similar to the one of the first permanent magnet generator 121, i.e., the second stator structure 1221 of the second permanent magnet generator 122 and the third stator structure 1231 of the third permanent magnet generator 123 can be similar to the first stator structure 1211 of the first permanent magnet generator 121, and the second rotor structure 1222 of the second permanent magnet generator 122 and the third rotor structure 1232 of the third permanent magnet generator 123 can be similar to the first rotor structure 1212 of the first permanent magnet generator 121. Detailed description for the second permanent magnet generator 122 and the third permanent magnet generator 123 is omitted herein for simplicity, and related illustration can be referred to FIG. 4 to FIG. 6 and the aforementioned paragraphs. Since the internal structures of the second permanent magnet generator 122 and the third permanent magnet generator 123 can be similar to the one of the first permanent magnet generator 121, the second permanent magnet generator 122 and the third permanent magnet generator 123 can not only generate electricity stably but also has better efficiency of electricity generation even in a condition of a low speed and a small angle of the rotating movement or the swinging movement of a second rotor body, which is not shown in the figures, of the second rotor structure 1222 relative to a second stator body, which is not shown in the figures, of the second stator structure 1221 and a low speed and a small angle of the rotating movement or the swinging movement of a third rotor body, which is not shown in the figures, of the third rotor structure 1232 relative to a third stator body, which is not shown in the figures, of the third stator structure 1231.

In addition, specifically, as shown in FIG. 1 to FIG. 3, in order to dispose the first stator structure 1211 on the main body 11, the multi-axial wave energy conversion device 1 further includes a fixing base 13. The fixing base 13 is fixedly connected to the first shell 12113 and the main body 11. Besides, in order to couple the first end 1241 and the second end 1242 of the arm 124 to the first rotor structure 1212 and the second rotor structure 1222 respectively, each permanent magnet generating assembly 12 includes a fixing connecting base 126, a first rotating connecting base 127, a second rotating connecting base 128, and the driving component 15 includes a third rotating connecting base 129. The first rotor structure 1212 further includes a first connecting shaft 12124 coupled to the first rotor body 12121 and passing through the first shell 12113. The second rotor structure 1222 further includes a second connecting shaft 12221 coupled to the second rotor body and passing through a second shell 12211. The third rotor structure 1232 further includes a third connecting shaft 12321 coupled to the third rotor body and passing through a third shell 12311. The fixing connecting base 126 is fixedly connected to the second shell 12211 and the third shell 12311. The first rotating connecting base 127 is fixedly connected to the first end 1241 of the arm 124 and the first connecting shaft 12124. The second rotating connecting base 128 is fixedly connected to the second end 1242 of the arm 124 and the second connecting shaft 12221. The third rotating connecting base 129 is fixedly connected to the floating plate and the third connecting shaft 12321. However, the present invention is not limited to this embodiment. It depends on practical demands.

Furthermore, as shown in FIG. 1 and FIG. 2, a first central axis R1 of the first rotor body 12121 can be parallel to a second central axis R2 of the second rotor body, and a third central axis R3 of the third rotor body can be perpendicular to the first central axis R1 and the second central axis R2. In such a way, a direction of the rotating movement or the swinging movement of the first rotor structure 1212 relative to the first stator structure 1211 is parallel to a direction of the rotating movement or the swinging movement of the second rotor structure 1222 relative to the second stator structure 1221, and a direction of the rotating movement or the swinging movement of the third rotor structure 1232 relative to the third stator structure 1231 is different from the direction of the rotating movement or the swinging movement of the second rotor structure 1222 relative to the second stator structure 1221 and the direction of the rotating movement or the swinging movement of the first rotor structure 1212 relative to the second stator structure 1221. In other words, in this embodiment, the first end 1241 of the arm 124 can swing or rotate relative to the main body 11 around a first axis, and the second end 1242 of the arm 124 can swing or rotate relative to the driving component 125 around a second axis parallel to the first axis and a third axis different from the first axis and the second axis. Therefore, the first permanent magnet generator 121, the second permanent magnet generator 122 and the third permanent magnet generator 123 can cooperatively convert the wave energy transmitted along different directions into electricity. However, the present invention is not limited thereto. In another embodiment, the directions of the rotating movements or the swinging movements of the first rotor body, the second rotor body and the third rotor body are not limited to this embodiment. It depends on practical demands. For example, in another embodiment, the directions of the rotating movements or the swinging movements of the first rotor body, the second rotor body and the third rotor body can be perpendicular, parallel or inclined to one another In this embodiment, the multi-axial wave energy conversion device 1 can convert the wave movements along different directions into the rotating movement or the swinging movement of the first rotor body 12121 of the first rotor structure 1212 relative to the first stator body 12111 of the first stator structure 1211, the rotating movement or the swinging movement of the second rotor body of the second rotor structure 1222 relative to the second stator body of the second stator structure 1221, and the rotating movement or the swinging movement of the third rotor body of the third rotor structure 1232 relative to the third stator body of the third stator structure 1231. Therefore, even if the wave direction is changed by wind, the multi-axial wave energy conversion device 1 still can generate electricity stably, which improves reliability and stability of electricity generation.

However, the present invention is not limited to the aforementioned embodiment. For example, in another embodiment, the first rotor structure can be coupled to the main body, and the first stator structure can be coupled to the arm. Alternatively, in another embodiment, the second rotor structure can be coupled to the arm, and the second stator structure can be coupled to the third rotor structure. Alternatively, in another embodiment, the second rotor structure can be coupled to the arm, and the second stator structure can be coupled to the third stator structure. Alternatively, in another embodiment, the second stator structure can be coupled to the arm, and the second rotor structure can be coupled to the third rotor structure. Alternatively, in another embodiment, the second stator structure can be coupled to the arm, and the second rotor structure can be coupled to the third stator structure. Alternatively, in another embodiment, when the third stator structure is coupled to the second rotor structure or the second stator structure, the driving component can be coupled to the third rotor structure. Alternatively, in another embodiment, when the third rotor structure is coupled to the second rotor structure or the second stator structure, the driving component can be coupled to the third stator structure. Alternatively, in another embodiment, the permanent magnet generating assembly even can include only one of the first permanent magnet generator, the second permanent magnet generator and the third permanent magnet generator. In other words, the permanent magnet generating assembly can include only one permanent magnet generator disposed or coupled between the main body and the arm or between the arm and the driving component, so that the rotor structure of the permanent magnet generator can be driven to rotate or swing relative to the stator structure of the permanent magnet generator when the arm moves relative to the main body or the driving component moves relative to the arm.

Figure 7:
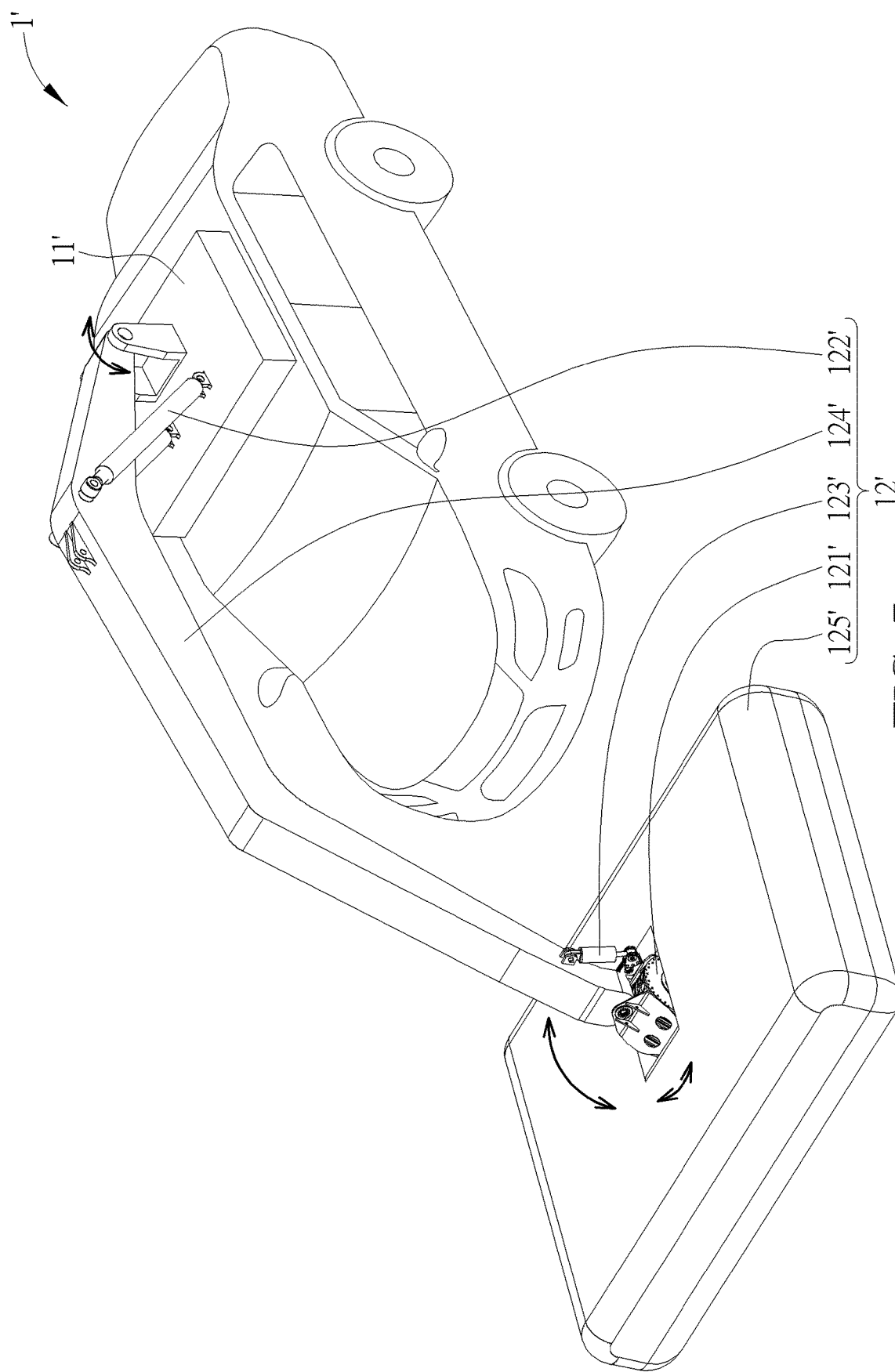
FIG. 7 is a diagram of a multi-axial wave energy conversion device according to a second embodiment of the present invention.
Figure 8:
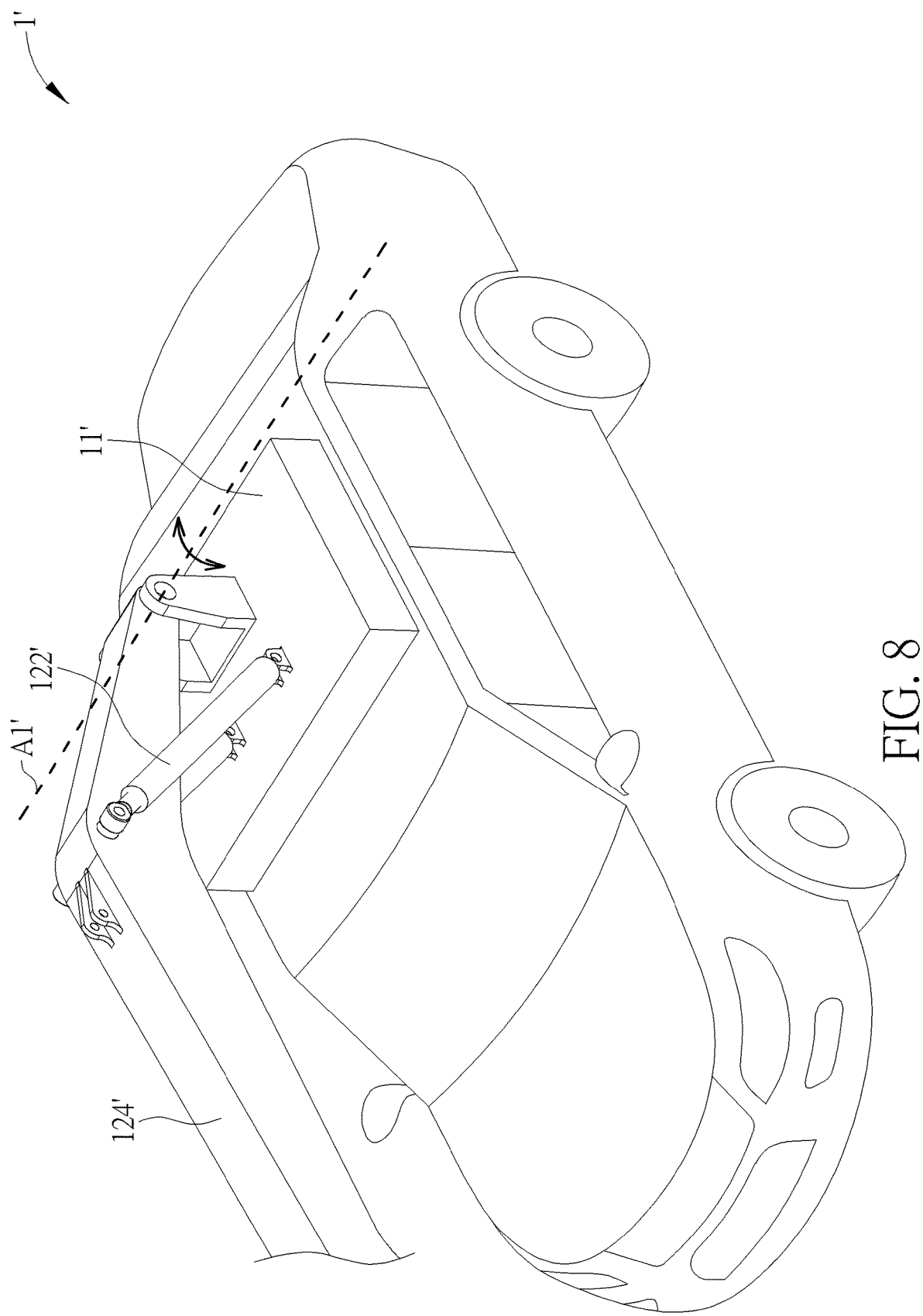
FIG. 8 is a partial enlarged diagram of the multi-axial wave energy conversion device according to the second embodiment of the present invention.
Figure 9:
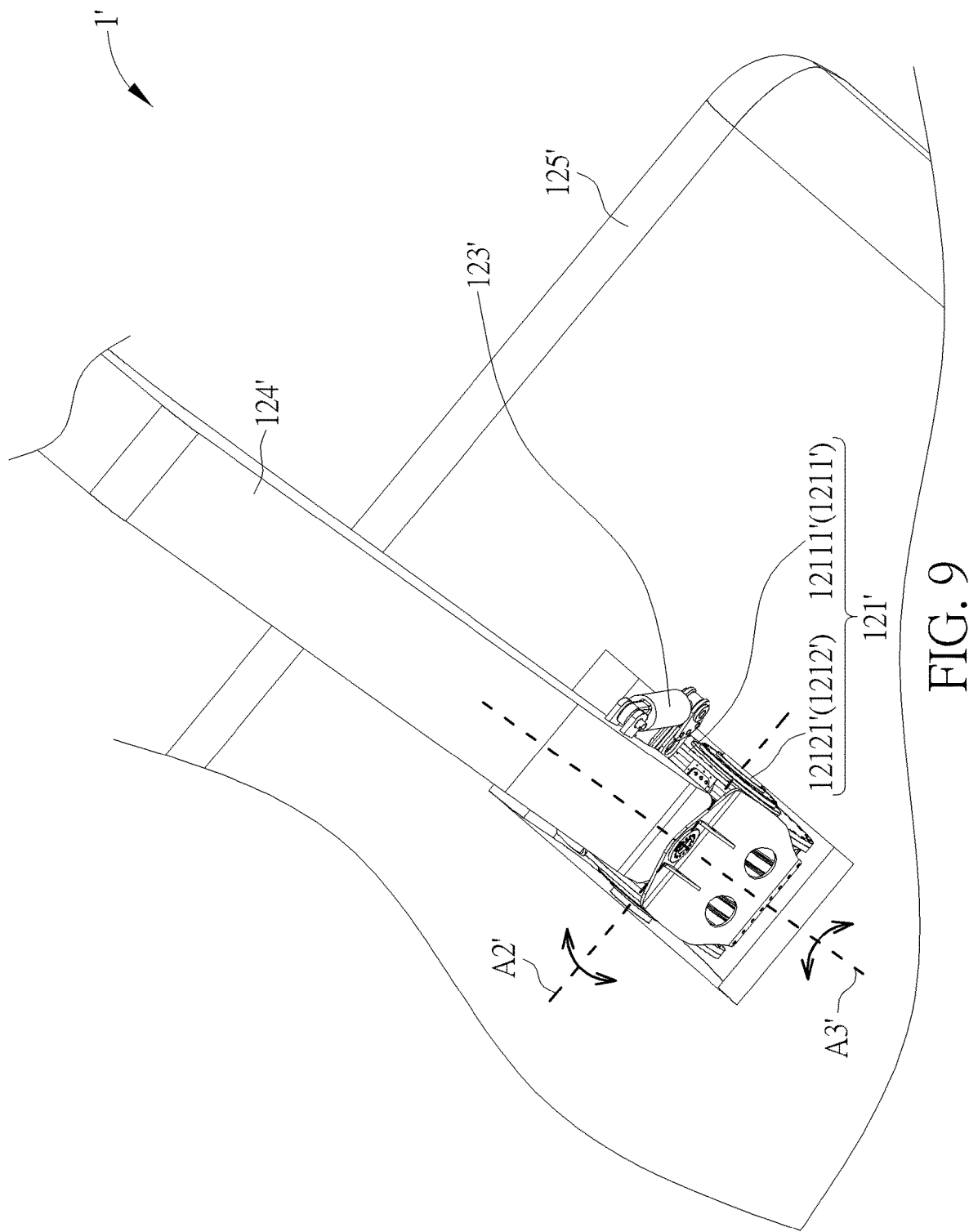
FIG. 9 is another partial enlarged diagram of the multi-axial wave energy conversion device according to the second embodiment of the present invention.

Please further refer to FIGS. 7 to 9. FIG. 7 is a diagram of a multi-axial wave energy conversion device 1' according to a second embodiment of the present invention. FIG. 8 is a partial enlarged diagram of the multi-axial wave energy conversion device 1' according to the second embodiment of the present invention. FIG. 9 is another partial enlarged diagram of the multi-axial wave energy conversion device 1' according to the second embodiment of the present invention. As shown in FIG. 7 to FIG. 9, different from the first embodiment, the multi-axial wave energy conversion device 1' includes a main body 11' and a permanent magnet generating assembly 12'. The main body 11' can be a fixing plate fixed onto a land vehicle or can be integrally formed with the land vehicle. The permanent magnet generating assembly 12' can include a third permanent magnet generator 121', a first hydraulic power generation device 122', a second hydraulic power generation device 123', an arm 124' and a driving component 125'. The structure and the operational principle of the third permanent magnet generator 121' of this embodiment are similar to the ones of the first permanent magnet generator 121 of the first embodiment, and detailed description for the third permanent magnet generator 121' is omitted herein for simplicity. A first end of the arm 124' is connected to the main body 11' in a rotating or swinging manner around a first axis A1', i.e., the first end of the arm 124' can swing or rotate relative to the main body 11' around the first axis A1', and a second end of the arm 124' is connected to a third shell 12111' of a third stator structure 1211' of the third permanent magnet generator 121' in a rotating or swinging manner around a third axis A3' different from the first axis A1', i.e., the third shell 12111' can swing or rotate relative to the second end of the arm 124' around the third axis A3'. The first hydraulic power generation device 122' is movably connected between the arm 124' and the main body 11' and retractable and extendable for generating electricity when the arm 124' is driven by waves to swing or rotate relative to the main body 121' around the first axis A1'. The second hydraulic power generation device 123' is movably connected between the arm 124' and the third shell 12111' and retractable and extendable for generating electricity when the third shell 12111' is driven by waves to swing or rotate relative to the arm 124' around the third axis A3'. The driving component 125' can include a floating component coupled to, more specifically, directly connected to, a third connecting shaft 12121' of a third rotor structure 1212' of the third permanent magnet generator 121', so that waves can drive the third rotor structure 1212' to rotate or swing relative to the third stator structure 1211' around a second axis A2' parallel to the first axis A1' and different from the third axis A3' by the driving component 125' for generating electricity. In other words, in this embodiment, a rotating axis of the third rotor structure 1212' relative to the third stator structure 1211' can be parallel to a rotating axis of the arm 124' relative to the main body 11' and different from a rotating axis of the third shell 12111' relative to the arm 124'. The structures and the operational principles of the first hydraulic power generation device 122' and the second hydraulic power generation device 123' are well-known by a skilled person in the prior art, and detailed description for the first hydraulic power generation device 122' and the second hydraulic power generation device 123' is omitted herein for simplicity.

However, the present invention is not limited to this embodiment. For example, in another embodiment, at least one of the first hydraulic power generation device and the second hydraulic power generation device can be omitted or replaced by at least another one permanent magnet generator whose structures are similar to the structures of the third permanent magnet generator coupled to the driving component.

In contrast to the prior art, in the present invention, the multi-axial wave energy conversion device can convert wave movements along different directions into the rotating movement or the swinging movement of the first rotor body relative to the first stator body, the rotating movement or the swinging movement of the second rotor body relative to the second stator body, and the rotating movement or the swinging movement of the third rotor body relative to the third stator body. Furthermore, the ratio of the number of the plurality of first rotor slots to the number of the plurality of first stator slots, the ratio of the number of the plurality of second rotor slots to the number of the plurality of second stator slots, and the ratio of the number of the plurality of third rotor slots to the number of the plurality of third stator slots are 8:9. The number of the plurality of first rotor slots, the number of the plurality of second rotor slots, and the number of the plurality of third rotor slots are at least equal to 64. The number of the plurality of first stator slots, the number of the plurality of second stator slots, and the number of the plurality of third stator slots are at least equal to 72. Due to the aforementioned configuration, the multi-axial wave energy conversion device only requires a low speed and a small angle of the rotating movement or the swinging movement of the first rotor body relative to the first stator body, a low speed and a small angle of the rotating movement or the swinging movement of the second rotor body relative to the second stator body, and a low speed and a small angle of the rotating movement or the swinging movement of the third rotor body relative to the third stator body, so as to generate electricity, but does not require a fixed wave direction. Therefore, even if amplitude of the wave movement is small and the wave direction is changed by wind, the multi-axial wave energy conversion device still can generate electricity stably, which improves reliability and stability of electricity generation. Besides, the multi-axial wave energy conversion device has simple structure, which reduces maintenance cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-axial wave energy conversion device comprising:
    a main body; and
    at least one permanent magnet generating assembly disposed on the main body, the at least one permanent magnet generating assembly comprising:
    a permanent magnet generator comprising:
        a stator structure comprising:
            a shell; and
            a stator body; and;
        a rotor structure comprising:
            a rotor body;
        an arm, a first end of the arm being coupled to the main body, a second end of the arm being coupled to the stator structure of the permanent magnet generator; and
        a driving component comprising a floating component directly connected to the rotor structure of the permanent magnet generator, the floating component being configured to be driven by wave energy for driving the rotor structure of the permanent magnet generator to rotate or swing relative to the stator structure of the permanent magnet generator;
    wherein the first end of the arm is capable of rotating or swinging relative to the main body around a first axis, the floating component is capable of rotating or swinging relative to the second end of the arm around both a second axis and a third axis, and the first axis, the second axis and the third axis are different from one another;
    wherein the second end of the arm is connected to the shell of the stator structure of the permanent magnet generator, the shell of the stator structure of the permanent magnet generator is capable of rotating or swinging relative to the second end of the arm around the third axis, the rotor body of the rotor structure of the permanent magnet generator is disposed inside the stator body of the stator structure of the permanent magnet generator, the rotor body of the rotor structure of the permanent magnet generator is capable of rotating or swinging relative to the stator body of the stator structure of the permanent magnet generator around the second axis;
    wherein the multi-axial wave energy conversion device further comprises:
    at least one hydraulic power generation device disposed between the arm and the main body and/or between the arm and the permanent magnet generator.

2. The multi-axial wave energy conversion device of claim 1, wherein the at least one hydraulic power generation device comprises:
    a first hydraulic power generation device disposed between the arm and the main body; and
    a second hydraulic power generation device disposed between the arm and the permanent magnet generator.

* * * * *